(12) United States Patent
Barrientos Juárez

(10) Patent No.: US 12,085,219 B1
(45) Date of Patent: Sep. 10, 2024

(54) MULTIMEDIA TRIPOD

(71) Applicant: Juan L Barrientos Juárez, Las Vegas, NV (US)

(72) Inventor: Juan L Barrientos Juárez, Las Vegas, NV (US)

(*) Notice: Subject to any disclaimer, the term of this patent is extended or adjusted under 35 U.S.C. 154(b) by 0 days.

(21) Appl. No.: 17/964,437

(22) Filed: Oct. 12, 2022

(51) Int. Cl.
*F16M 11/06* (2006.01)
*F16M 13/02* (2006.01)

(52) U.S. Cl.
CPC .......... *F16M 11/06* (2013.01); *F16M 13/022* (2013.01); *F16M 2200/022* (2013.01); *F16M 2200/066* (2013.01)

(58) Field of Classification Search
CPC ................ F16M 11/06; F16M 13/022; F16M 2200/022; F16M 2200/066
See application file for complete search history.

(56) References Cited

U.S. PATENT DOCUMENTS

| | | | | |
|---|---|---|---|---|
| 3,970,835 A * | 7/1976 | Crete | ...................... | G03B 15/02 362/11 |
| 4,081,814 A * | 3/1978 | Bulland | ................. | F16M 11/08 248/187.1 |
| 4,085,915 A * | 4/1978 | Song | .................... | F16M 11/041 248/187.1 |
| 4,671,478 A * | 6/1987 | Schoenig | ............. | F16M 11/245 248/123.2 |
| 5,630,566 A * | 5/1997 | Case | ...................... | F16M 11/42 248/122.1 |
| 5,865,406 A * | 2/1999 | Teeple | ................. | F16M 11/245 396/419 |
| 6,991,384 B1* | 1/2006 | Davis | ................... | F16M 11/041 396/428 |
| 9,243,737 B2* | 1/2016 | Hida | .................... | F16M 11/045 |
| 9,648,217 B2* | 5/2017 | Kaiser | ................... | F16M 13/02 |
| 9,980,561 B1* | 5/2018 | Constantino | ......... | F16M 13/022 |
| 10,474,006 B2* | 11/2019 | Ariav | ..................... | E04H 15/18 |
| 10,663,839 B1* | 5/2020 | O'Brien | ................ | F16M 11/16 |
| 10,999,570 B2* | 5/2021 | Banta | ................... | G03B 17/561 |
| 11,429,012 B2* | 8/2022 | Holland | ............... | G03B 17/565 |
| 11,525,542 B2* | 12/2022 | Liao | ....................... | F16M 11/10 |
| 2005/0017138 A1* | 1/2005 | Hardin | .................. | F16M 11/42 248/129 |
| 2006/0192071 A1* | 8/2006 | Choi | ..................... | A47B 97/08 248/460 |
| 2007/0090237 A1* | 4/2007 | Hsu | ........................ | F16M 11/14 248/177.1 |
| 2008/0078914 A1* | 4/2008 | Liao | ....................... | G10D 13/28 248/435 |
| 2010/0213151 A1* | 8/2010 | Theesfeld | ............. | F16M 11/24 211/151 |
| 2011/0205426 A1* | 8/2011 | Kang | .................... | G03B 17/566 348/373 |
| 2014/0070059 A1* | 3/2014 | Vieira | .................... | A47B 97/00 248/122.1 |

(Continued)

Primary Examiner — Monica E Millner
(74) Attorney, Agent, or Firm — Ernesto Garcia

(57) ABSTRACT

A multimedia tripod utilizing three or more tripod heads to obtain three or more different angles of a scene at the same time. The tripod is manually adjustable utilizing clamps to adjust the tripod heads. The tripod is portable and provides multiple adjustments to the tripod heads using clamps split in two halves where one is fixed and the other able to clamp.

18 Claims, 5 Drawing Sheets

(56) References Cited

U.S. PATENT DOCUMENTS

| | | | |
|---|---|---|---|
| 2015/0076296 A1* | 3/2015 | Yang | F16M 11/32 248/163.2 |
| 2016/0342073 A1* | 11/2016 | Myers | F16M 11/14 |
| 2017/0347170 A1* | 11/2017 | Liao | F16M 11/2021 |
| 2020/0132522 A1* | 4/2020 | Becker | F16M 11/34 |
| 2022/0349516 A1* | 11/2022 | Liao | F16M 11/10 |

* cited by examiner

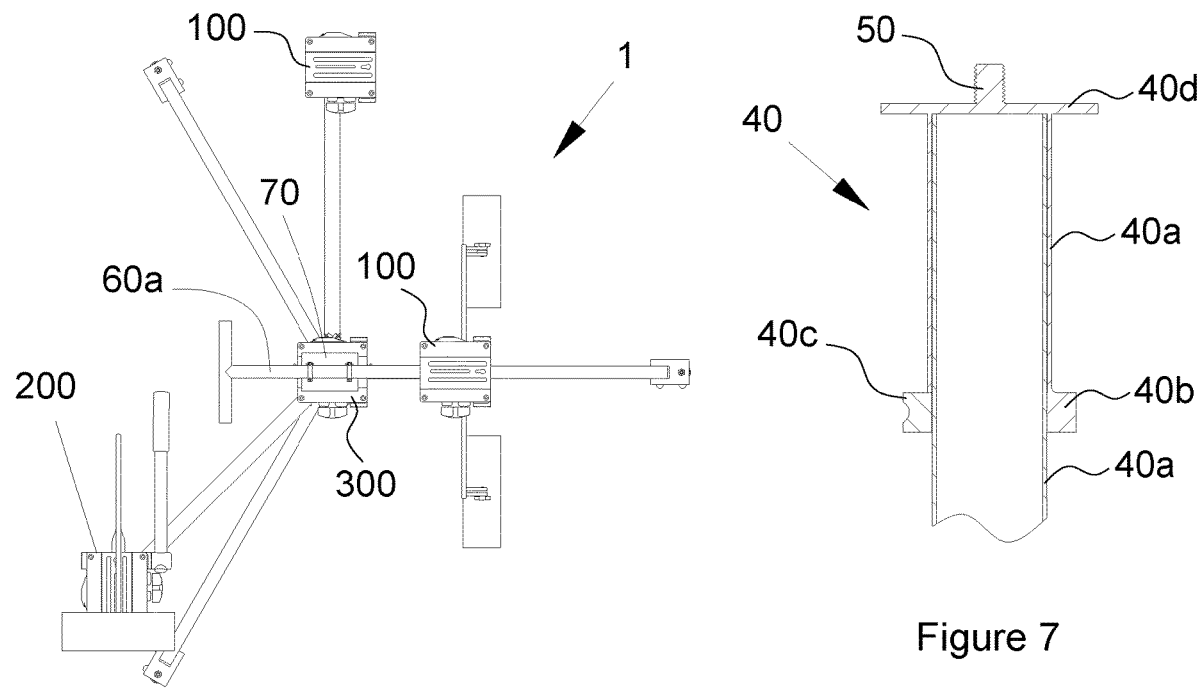
Figure 5
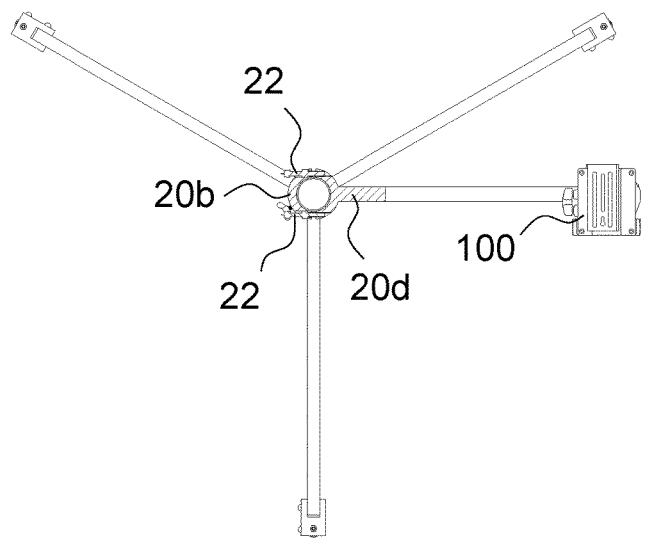
Figure 7
Figure 6
Figure 8

MULTIMEDIA TRIPOD

FIELD OF THE INVENTION

The present invention relates to a tripod providing support to three tripod heads thus allowing to place three cameras and record a scene from three different angles. The tripod can be used to adjust the position of three tripod heads to simultaneously record a scene from different angles.

BACKGROUND OF THE INVENTION

It's well known that people use one camera to record video at one angle of a scene. At times people repeat a scene from a different angle repeating the scene using a second camera or the same care adjusted at a different angle and thus compose a master video utilizing both recordings alternating between both scenes to make a video.

While the above approach requires two adjustable tripods or just one adjustable tripod, there's a need for an adjustable tripod that can handle three cameras so that all three cameras simultaneously record a video at different angles. There's a need to simultaneously record video at three or more angles so that if the footage of one camera is ever lost, the two remaining cameras can substitute recording at different angles.

SUMMARY OF THE INVENTION

The present invention describes an adjustable tripod comprising at least three tripod heads to allow the mounting of three cameras so that each camera simultaneously records an event such a wedding or a live presentation. Each tripod head is allowed to be mounted along a pole of the tripod and allowed to be adjustable so that a camera can be adjusted when mounted thereon. The tripod further has the quality of being portable and accommodating lighting. It is envisioned that the tripod utilizes off the shelf tripod heads such as one named a cam caddie scorpion, a ball joint caddie, or any type of cam caddie that contains a standard thread hole at its base.

DETAIL DESCRIPTION OF THE DRAWINGS

Figure 1:
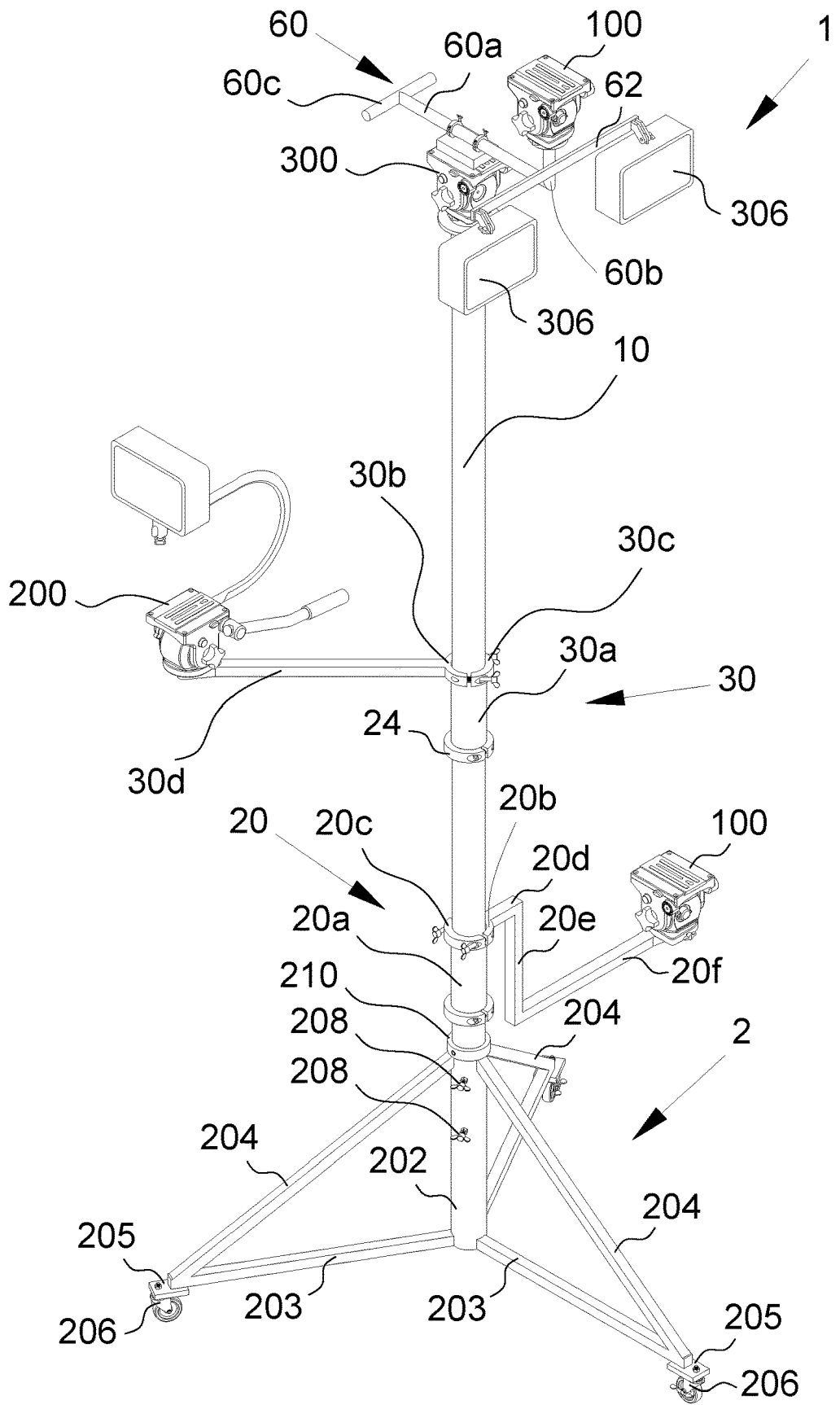
Figure 2:
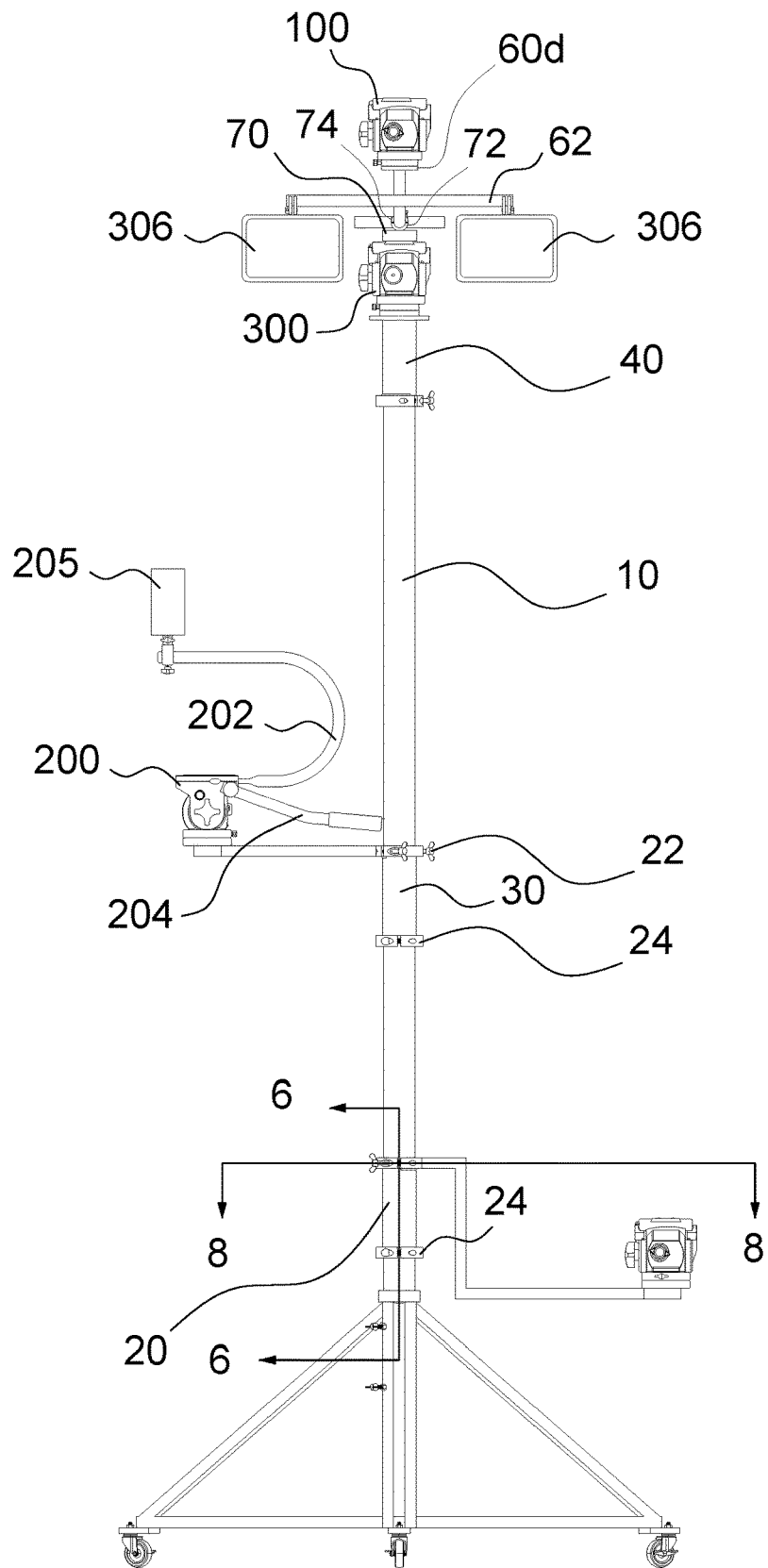
Figure 3:
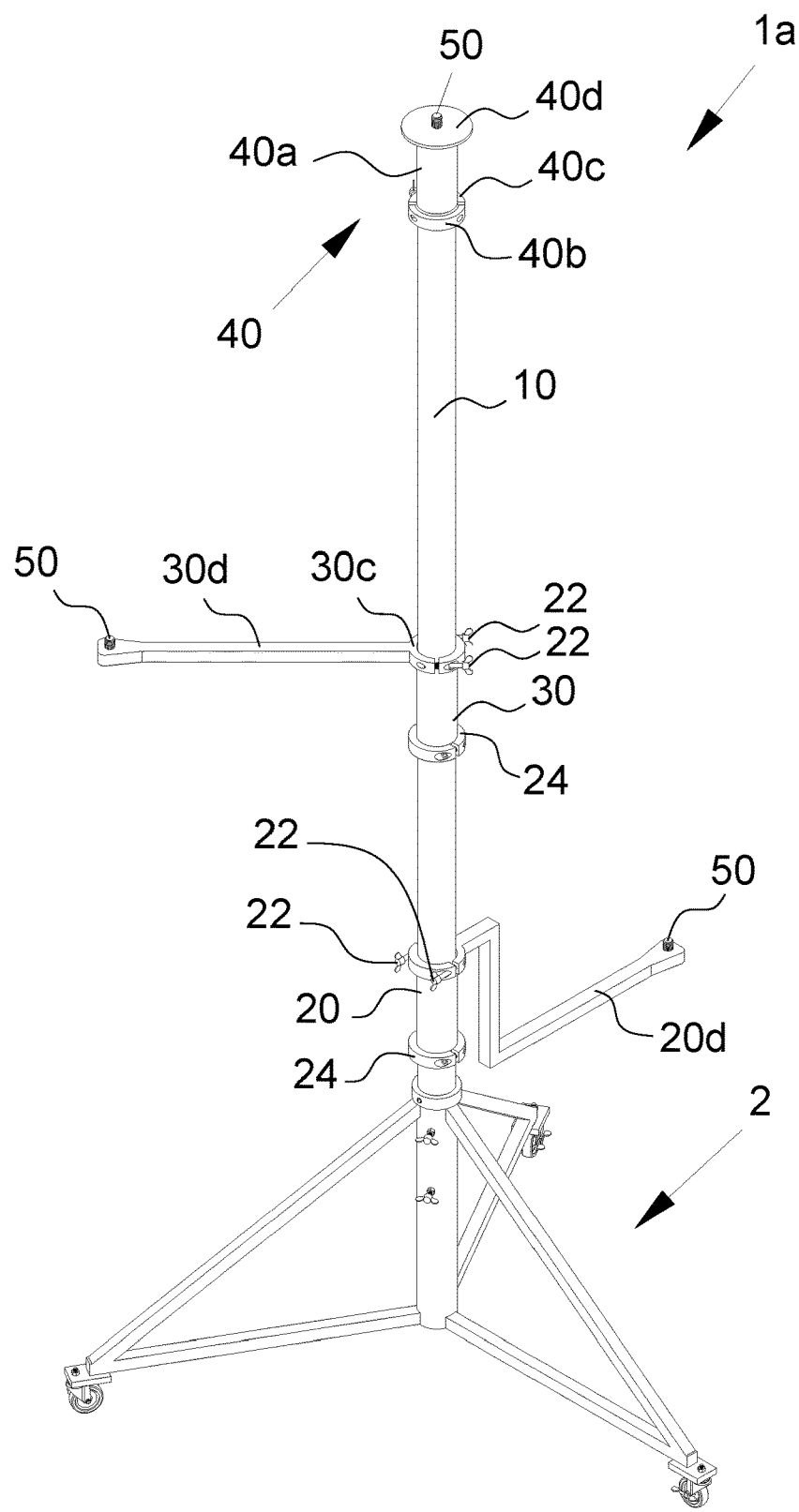
Figure 4:
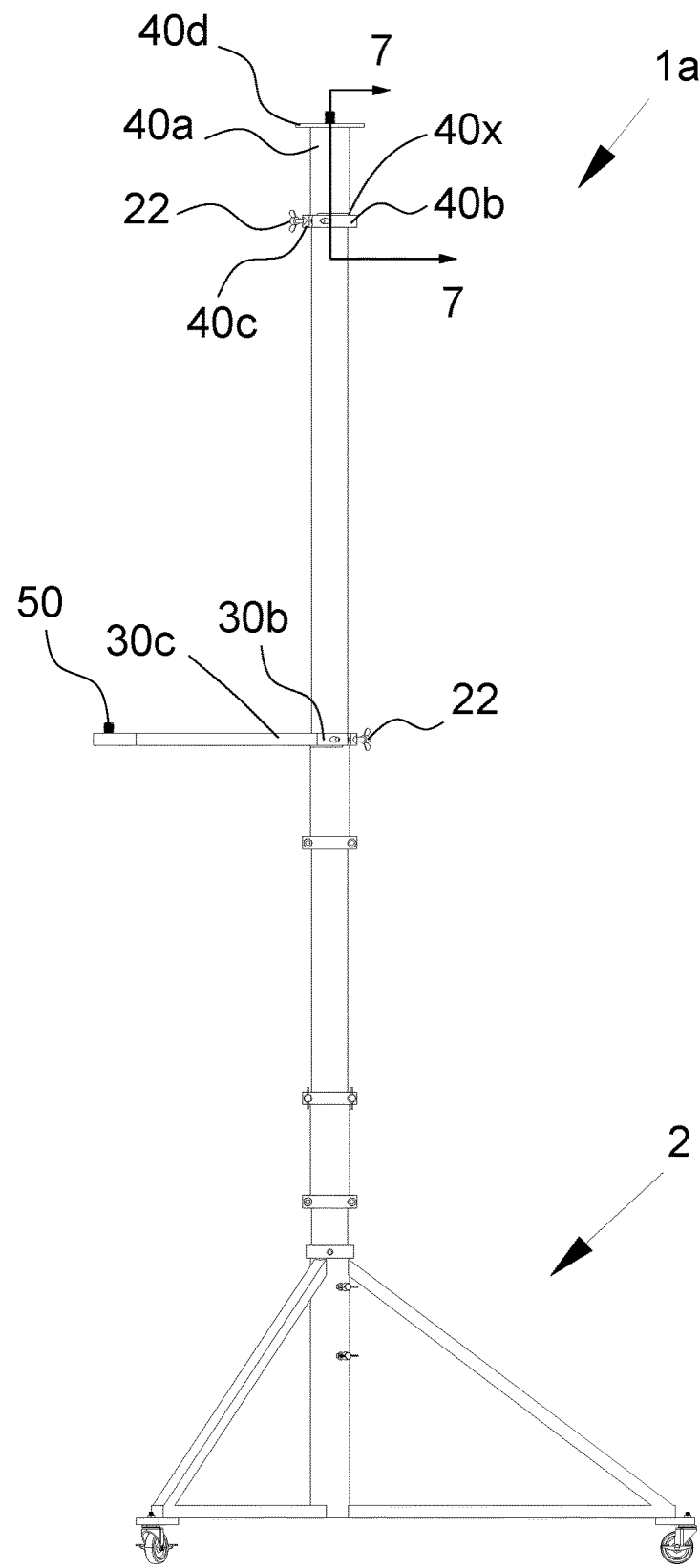

FIG. 1 shows an isometric view of the tripod having tripod heads.
FIG. 2 shows a front view of the tripod shown in FIG. 1.
FIG. 3 shows an isometric view of the tripod without the tripod heads shown in FIG. 1.
FIG. 4 shows a front view of the tripod shown in FIG. 3.
FIG. 5 shows a top view of the tripod shown in FIG. 1.
FIG. 6 shows cross-sectional view 6-6 shown in FIG. 2.
FIG. 7 shows cross-sectional view 7-7 shown in FIG. 4.
FIG. 8 shows cross-sectional view 8-8 shown in FIG. 2.

DETAIL DESCRIPTION OF THE DRAWINGS

FIG. 1 shows an isometric view of the invention. It shows an assembled tripod 1 comprising a base 2 and elongated pole 10. The base 2 includes a receptacle 202 allowing the elongated pole 10 so to sit inside. The receptacle 202 comprising a hollow tube opened at both ends. The base 2 further includes three legs 203 extending from a bottom portion of the receptacle 202. The legs 203 are separated at 120 degrees apart. A gusset 204 respectively extends between the top of the receptacle 202 and at one end of each of the legs 203 forming a triangle. The receptacle 202 includes threaded fasteners 208 to lock the elongated pole 10 from moving. As shown in FIG. 1, a shoulder 210 is fastened to the elongated pole 10, which acts as a stop so that the elongated pole 10 is prevented from sliding past the receptacle 202. A support plate 205 is connected to each of the legs 203. A caster 206 is mounted to each of the support plate 205 to allow the assembled tripod 1 to be portable. As customary, the casters 206 can include a locking feature so as to prevent the assembled tripod from moving.

FIG. 1 further shows the elongated pole 10 include three movable mounts 20, 30, 40 that respectively allow the fixing of three tripod heads 100, 200, 300. The first movable mount 20 comprises a cylindrical sleeve 20a such that it can slide along the elongated pole 10 thus having a sliding clearance with the elongated pole 10. An arch saddle 20b is welded or fixed to the cylindrical sleeve 20a at one end. A closing arch clamp 20c is fastened to the arch saddle 20b via winged fasteners 22 as shown in FIGS. 3 and 8. The first movable mount 20 is stopped from sliding along the elongated pole 10 using a tube clamp 24 comprised of two half arches joined together with threaded fasteners. The first movable mount 20 further includes a short arm 20b extending from the arch saddle 20b. A bridge arm 20e extends from the short arm 20b parallel to the elongated pole 10. A support arm 20f extending perpendicular to the bridge arm 20e and thus supports a tripod head 100. As it is well in the art, a tripod head includes a base with a threaded hole to be fastened to a threaded fastener 50 extending from the support arm 20f. The first movable mount 20 is rotatable around the elongated pole 10 while it is supported on top of the tube clamp 24. When one reaches a desired angle, the winged fasteners 22 are tightened and the first movable mount 20 is precluded from moving and thus maintained fixed so a camera can focus on a particular angle when mounted to the tripod head 100.

Similar in structure, the second mount 30 comprises a cylindrical sleeve 30a such that it can slide along the elongated pole 10 thus having a sliding clearance with the elongated pole 10. An arch saddle 30b is welded or fixed to the cylindrical sleeve 30a at one end. A closing arch clamp 30c is fastened to the arch saddle 30b via winged fasteners 22 as shown in FIGS. 3 and 8. The second movable mount 30 is stopped from sliding along the elongated pole 10 using another tube clamp 24 comprised of two half arches joined together with threaded fasteners 25 as shown in FIG. 6. The second movable mount 20 further includes an extended arm 30d extending perpendicular to the elongated pole 10. At one end of the extended arm 30d includes a threaded fastener 50 which allows the fixing of a second tripod head 200. The second movable mount 30 is rotatable around the elongated pole 10 while it is supported on top of the tube clamp 24. When one reaches a desired angle, the winged fasteners 22 are tightened and the second movable mount 30 is precluded from moving and thus maintained fixed so a camera can focus on a particular angle when mounted to the tripod head 200. The tripod head 200 is of the type called a cam caddie scorpion readily available on the market. The tripod head 200 comprises a rotated U-member 202 connected thereon thus the name scorpion. At one end of the U-member 202 is a light 205 fixed to provide lighting to a recording. The tripod head 200 further includes a handle 204 so that the tripod head 200 can be adjusted.

As shown in FIGS. 2, 4, and 7, the portable tripod 1 includes a third mount 40 where a third tripod head 300 is mounted thereon. The third mount 40 comprises cylindrical sleeve 40a. At one end of the sleeve 40a, a saddle 40b is welded thereon or made integral with the sleeve 40a. A clamp 40c is connected to the saddle 40b using fasteners 22 so as to prevent the sleeve 40*a* from rotating thus becoming fixed to the elongated pole 10. At the opposite end of the sleeve 40*a* includes a mount plate 40*d* enclosing the sleeve 40*a*. The mount plate 40*d* includes a threaded fastener 50 so as to mount the third tripod head 300. It is envisioned that the mount plate 40*d* will abut the end of the elongated pole 10 and thus stop the sleeve 40*a* from sliding down. Once the third tripod head is mounted thereon. One can rotate the third mount 40 by unloosing the fasteners 22 and when one has reached a desired angle, the fasteners 22 will lock the third mount 40.

FIG. 3 should be noted that it just shows the subassembly 1*a* of the tripod and thus does not include any tripod heads. It is to show the threaded fasteners 50 and solely with the three mounts 20, 30, 40.

FIGS. 1, 2, and 5 show the third tripod head 300 including a tilt assembly 60 comprising a rod member 60*a*, a vertical support 60*b* extending perpendicular to the rod member 60*a* at one end. At the opposite end of the rod member 60*a*, it includes a cross handle 60*c* so as to allow the tilting of the third head 300. The rod member 60*a* further includes a ballast mast 72 with a dovetail so as to be mounted to the third head 300. The ballast mast 72 includes two saddles 72 fixed thereon. The two saddles 72 in conjunction with two arch clamps 74 allow the tilt assembly to be adjusted in and out. At the end of the vertical support 60*b*, it includes a support base 60*d* similar in structure as the mount plate 40*d*, which also includes a threaded fastener 50, not visible. This support base 60*d* allows the mounting of a similar tripod head 100 thereon so as to put a camera. A cross beam 62 is fixed to the vertical support 60*b* across so as to allow the fixing of two lights 306 and illuminate a scene.

While emphasizes has been made to using cameras, the invention can be practiced with cellular phones. While some of the threaded fasteners are simple headed bolts, these bolts can also include a T-handle or a star handle. In the embodiment disclosed, the threaded fasteners use butterfly wings but of course any type of handle can be interchanged. Furthermore, it is envisioned that the tripod heads can be interchanged with other types of tripod heads.

The invention claimed is:

1. A multi-media tripod comprising a base, an elongated pole, at least three mounts, and at least three tripod heads;
    wherein the base comprising a receptacle receiving the elongated pole having a shoulder abutting the receptacle;
    wherein the receptacle comprising a tube opened at both ends;
    wherein the base further includes three legs extending perpendicular to the receptacle and each of the legs being 120 degrees apart;
    wherein the base further includes three gussets, each extending from one end of the receptacle to one end of the legs; and,
    wherein two of the three mounts comprising each a cylindrical sleeve, a saddle fixed to one end of the cylindrical sleeve, and a clamp connected to the saddle; and,
    wherein the saddle and the clamp wrap the elongated pole so as to allow the cylindrical sleeve to be rotatable.

2. The multi-media tripod of claim 1, wherein the saddle is C-shaped and the clamp is C-shaped.

3. The multi-media tripod of claim 1, wherein a short arm extends from the saddle perpendicular to the elongated pole;
    wherein a bridge arm extends perpendicular to the short arm; and,
    wherein a support arm extends perpendicular to the bridge arm and having a fastener at one end of the support arm.

4. The multi-media tripod of claim 1, wherein a short arm extends from the saddle perpendicular to the elongated pole;
    wherein an extended arm extends from the saddle perpendicular to the elongated pole; and,
    wherein the extended arm having a fastener at one end of the extended arm.

5. The multi-media tripod of claim 1, wherein a tube clamp respectively abuts each of the cylindrical sleeves and being clamped to the elongated pole.

6. The multi-media tripod of claim 1, wherein each of the three legs including a caster.

7. The multi-media tripod of claim 1, wherein one of the three mounts comprising a cylindrical sleeve, a saddle fixed to a bottom portion of the cylindrical sleeve, and a clamp connected to the saddle;
    wherein a mount plate encloses a top portion of the cylindrical sleeve and the mount plate includes a fastener; and,
    wherein the cylindrical sleeve being mounted at one end of the elongated pole.

8. The multi-media tripod of claim 7, wherein one of the tripod heads is connected to the fastener of the mount plate.

9. A multi-media tripod comprising a base, an elongated pole, at least three mounts, and at least three tripod heads;
    wherein the base comprising a receptacle receiving the elongated pole having a shoulder abutting the receptacle;
    wherein the receptacle comprising a tube opened at both ends;
    wherein the base further includes three legs extending perpendicular to the receptacle and each of the legs being 120 degrees apart;
    wherein the base further includes three gussets, each extending from one end of the receptacle to one end of the legs;
    wherein one of the three mounts comprising a cylindrical sleeve, a saddle fixed to a bottom portion of the cylindrical sleeve, and a clamp connected to the saddle;
    wherein a mount plate encloses a top portion of the cylindrical sleeve and the mount plate includes a fastener;
    wherein the cylindrical sleeve being mounted at one end of the elongated pole;
    wherein one of the tripod heads is connected to the fastener of the mount plate;
    wherein a tilt assembly is mounted to the fastener of the mount plate;
    wherein the tilt assembly comprising ballast mast including a dovetail to be connected to the tripod head connected to the fastener of the mount plate;
    wherein the tilt assembly further comprising two clamps connected to the ballast mast and clamping a rod member;
    wherein the rod member including a vertical support extending perpendicular to the rod member; and,
    wherein the vertical support includes a support base having a threaded fastener.

10. The multi-media tripod of claim 9, wherein the rod member includes a cross handle fixed at one end of the rod member.

11. The multi-media tripod of claim 10, wherein an additional tripod head is mounted to the threaded fastener of the support base.

12. The multi-media tripod of claim 10, wherein a cross beam is fixed across the vertical support so as to allow the mounting of two lights.

13. The multi-media tripod of claim 1, wherein one of the three tripod heads comprising a cam caddie scorpion.

14. The multi-media tripod of claim 13, wherein two of the three mounts comprising each a cylindrical sleeve, a saddle fixed to one end of the cylindrical sleeve, and a clamp connected to the saddle; and, wherein the saddle and the clamp wrap the elongated pole so as to allow the cylindrical sleeve to be rotatable.

15. The multi-media tripod of claim 13, wherein a short arm extends from the saddle perpendicular to the elongated pole;

wherein a bridge arm extends perpendicular to the short arm; and, wherein a support arm extends perpendicular to the bridge arm and having a fastener at one end of the support arm.

16. The multi-media tripod of claim 13, wherein a short arm extends from the saddle perpendicular to the elongated pole;

wherein an extended arm extends from the saddle perpendicular to the elongated pole; and, wherein the extended arm having a fastener at one end of the extended arm.

17. The multi-media tripod of claim 14, wherein a tube clamp abuts each of the cylindrical sleeves and being clamped to the elongated pole.

18. The multi-media tripod of claim 13, wherein one of the three mounts comprising a cylindrical sleeve, a saddle fixed to a bottom portion of the cylindrical sleeve, and a clamp connected to the saddle;

wherein a mount plate encloses a top portion of the cylindrical sleeve and the mount plate includes a fastener; and, wherein the cylindrical sleeve being mounted at one end of the elongated pole.

* * * * *